(12) United States Patent
Kim et al.

(10) Patent No.: US 8,025,448 B2
(45) Date of Patent: Sep. 27, 2011

(54) FOCAL PLANE SHUTTER, PHOTOGRAPHING APPARATUS INCLUDING THE SAME, AND PHOTOGRAPHING METHOD FOR THE PHOTOGRAPHING APPARATUS

(75) Inventors: Myung-gyu Kim, Changwon (KR); Yoshinobu Tanaka, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 12/215,129

(22) Filed: Jun. 25, 2008

(65) Prior Publication Data
US 2009/0041447 A1 Feb. 12, 2009

(30) Foreign Application Priority Data

Aug. 8, 2007 (KR) .................. 10-2007-0079710

(51) Int. Cl.
*G03B 9/08* (2006.01)
(52) U.S. Cl. .................. 396/452; 396/456; 396/480
(58) Field of Classification Search .................. 396/246, 396/247, 235, 357, 456, 480
See application file for complete search history.

(56) References Cited

U.S. PATENT DOCUMENTS

| | | | | |
|---|---|---|---|---|
| 3,886,573 A | * | 5/1975 | Ogihara et al. | 396/475 |
| 4,096,505 A | * | 6/1978 | Onda et al. | 396/489 |
| 4,268,147 A | | 5/1981 | Date et al. | |
| 4,487,492 A | * | 12/1984 | Toyoda et al. | 396/466 |
| 4,737,808 A | * | 4/1988 | Toyoda | 396/489 |
| 5,257,052 A | * | 10/1993 | Kurosaki et al. | 396/358 |
| 5,475,459 A | * | 12/1995 | Matsubara et al. | 396/484 |
| 5,594,521 A | | 1/1997 | Hasuda et al. | |
| 5,878,296 A | | 3/1999 | Ogi et al. | |
| 6,123,467 A | * | 9/2000 | Shimada | 396/452 |
| 6,485,200 B2 | * | 11/2002 | Tanikawa et al. | 396/489 |
| 2006/0067676 A1 | * | 3/2006 | Toyoda | 396/466 |
| 2009/0310012 A1 | * | 12/2009 | Ueda et al. | 348/348 |
| 2010/0103306 A1 | * | 4/2010 | Ueda et al. | 348/333.12 |

FOREIGN PATENT DOCUMENTS
GB 1 534 082 A 11/1978

* cited by examiner

*Primary Examiner* — Clayton E Laballe
*Assistant Examiner* — Linda B Smith
(74) *Attorney, Agent, or Firm* — Drinker Biddle & Reath LLP

(57) ABSTRACT

Provided are a focal plane shutter, which can offer a live view function, and improve a control velocity of a shutter speed to reduce a time interval between shootings, a photographing apparatus including the focal plane shutter, and a photographing method for the photographing apparatus. The focal plane shutter includes: a front curtain; a rear curtain; a support part coupled to one side of the front curtain and the rear curtain; and a movable part movably contacting one side of the support part, wherein either the front curtain or the rear curtain is independently moved by the motion of the movable part.

23 Claims, 6 Drawing Sheets

FOCAL PLANE SHUTTER, PHOTOGRAPHING APPARATUS INCLUDING THE SAME, AND PHOTOGRAPHING METHOD FOR THE PHOTOGRAPHING APPARATUS

CROSS-REFERENCE TO RELATED PATENT APPLICATION

This application claims the benefit of Korean Patent Application No. 10-2007-0079710, filed on Aug. 8, 2007, in the Korean Intellectual Property Office, the disclosure of which is incorporated herein in its entirety by reference.

BACKGROUND OF THE INVENTION

1. Field of the Invention

The present invention relates to a focal plane shutter, a photographing apparatus including the same, and a photographing method for the photographing apparatus, and more particularly, to a focal plane shutter, which can offer a live view function and improve a control velocity of a shutter speed to reduce a time interval between shootings, a photographing apparatus including the focal plane shutter, and a photographing method for the photographing apparatus.

2. Description of the Related Art

The rapid progress in electronics, computers, and the semiconductor technology has changed our daily lives. Personal computers (PCs), which are connected to the Internet and provide various content services, such as community, chatting, games, shopping, and news, are widely used in homes, schools, and offices. Not long ago, the most common way to see photographs was to take the film to a photo processor who would develop a film and print the photographs. With the rapid development in the semiconductor industry digital cameras were commercially introduced.

Digital cameras using a charge coupled device (CCD), which is a semiconductor device, instead of a film are largely available, and mobile communication terminals are also equipped with digital cameras therein. Since digital cameras convert an image into data representing logic (e.g., 0 and 1), digital cameras can provide high robustness against noise, produce high quality signals at low cost, easily process information, compress information like an MPEG audio layer-3 (MP3), joint photographic coding experts group (JPEG), and moving picture experts group (MPEG), and reduce the size of a recording medium.

Digital cameras can be roughly divided into rangefinder cameras and lens reflex cameras.

Rangefinder cameras have a viewfinder in addition to a lens to look through to compose an image. Most of the current autofocus compact cameras and consumer-grade digital cameras are rangefinder cameras in which rangefinders (e.g., a pair of rangefinders) are used to focus a picture.

A rangefinder, which measures a distance to a subject by eliminating parallax, has been used for artillery to measure a distance. When a camera is not focused, two images appear at the center of a viewfinder. Accordingly, the camera is focused by turning a lens rangefinder until the two images are perfectly superimposed. In general, the viewfinder is disposed over a left side of the lens. Because the viewfinder and the lens are placed at different positions, an apparent displacement of the subject occurs, i.e., parallax, as seen from the viewfinder and the lens. Since parallax increases as the subject approaches the camera, parallax correction is necessary when shooting close-up photographs. Since a rangefinder camera has a simple structure without using a mirror and employs a lens shutter, vibration and noise are low during shooting. Since the rangefinder camera has no mirror shock like a single lens reflex (SLR) camera, there is no risk of shaking the rangefinder camera. However, since a lens shutter is employed, the rangefinder camera does not have lens interchangeability, and has an iris and a shutter speed that are more limited than those of the SLR camera.

Figure 1:
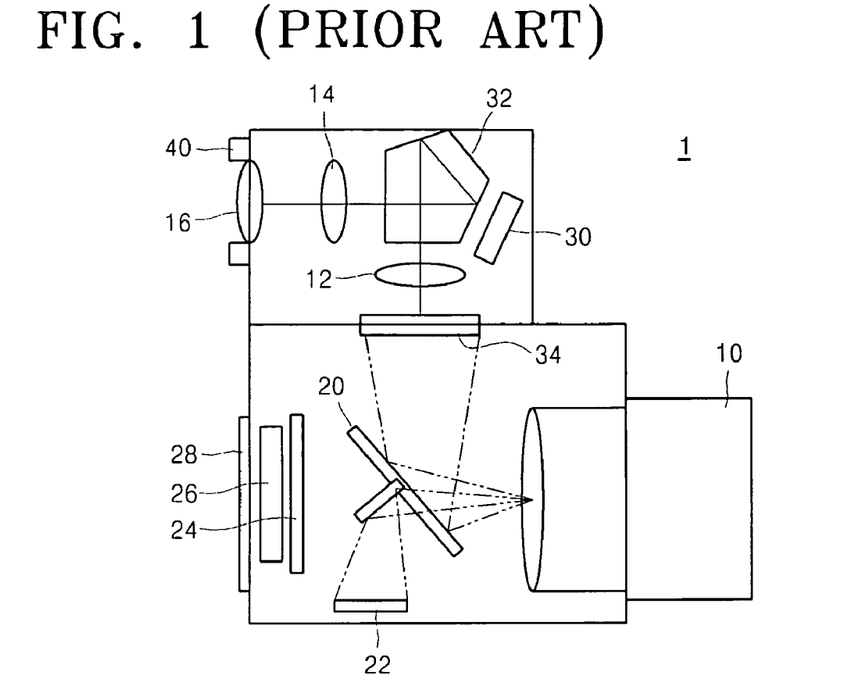
FIG. 1 is a cross-sectional view of a conventional single lens reflex (SLR) camera before a shutter is operated.
Figure 2:
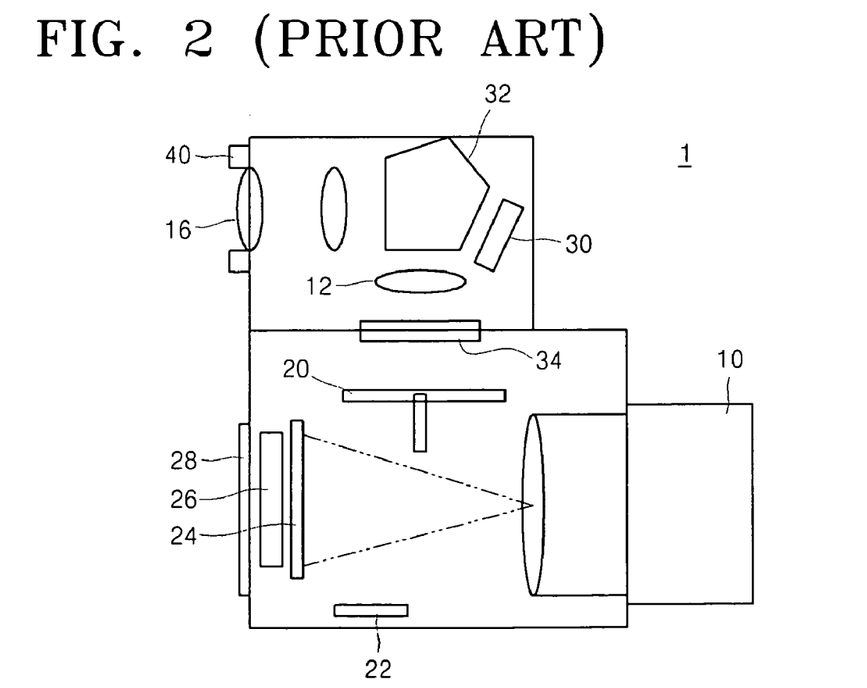
FIG. 2 is a cross-sectional view of the conventional SLR camera of FIG. 1 after the shutter is operated.

Lens reflex cameras can be roughly divided into SLR cameras and twin lens reflex cameras. A conventional SLR camera 1, which uses a mirror 20 to reflect an image incident through a lens 10 to a finder screen 34 and a viewfinder 40 to see the image, is shown in FIGS. 1 and 2.

Most of the processional-grade cameras are SLR cameras. FIG. 1 is a cross-sectional view of the conventional SLR camera 1 before a shutter is operated. FIG. 2 is a cross-sectional view of the conventional SLR camera 1 after the shutter is operated. Referring to FIG. 1, an image introduced through the lens 10 of the conventional SLR camera 1 is reflected by the mirror 20 to the finder screen 34, passes through a first objective lens 12, is deviated by a pentaprism 32 by 90° to a second objective lens 14 and a third objective lens 16, and is seen through the viewfinder 40.

The pentaprism 32 is a five-sided reflecting prism that reflects light several times therein and transmits the light through a right angle without inverting it. Since a plurality of optical elements, namely prisms and mirrors, are used in the conventional SLR camera 1, the conventional SLR camera 1 is bulky and heavy.

When the shutter is operated to photograph an image, the mirror 20, disposed in front of an image pickup device 26, is raised to allow an image incident through the lens 10 to enter the image pickup device 26.

In general, the image pickup device 26 is a charge coupled device (CCD) or a complementary metal-oxide semiconductor (CMOS). The shutter 24, which is disposed in front of the image pickup device 26 and passes light for a predetermined period of time, is also called a focal plane shutter.

In general, a focal plane shutter is a horizontal or vertical travel shutter which usually includes two cloths or metal curtains installed in front of a focal surface of a lens and allows a photosensitive material to be exposed to a proper amount of light by controlling a slit between a front curtain and a rear curtain or the speed of travel of the front curtain and the rear curtain. Focal plane shutters are widely used in cameras requiring the use of interchangeable lenses such as, for example SLR cameras.

In particular, focal plane shutters are often used in cameras with a format of 6×6 cm or less. Focal plane shutters determine an exposure time by adjusting the width of a slit using a speed regulator or an electrically controlled electromagnet while maintaining a shutter blind speed constant. Focal plane shutters allow for use of interchangeable lenses and enable high speed photographing.

Since the conventional SLR camera 1 can interchange the lens 10 or other lens designed exclusively for digital cameras, the conventional SLR camera 1 can selectively use lenses according to a preference or objective of a user. Also, since the image pickup device 26 is much bigger than that of other conventional digital cameras, noise can be prevented under low illumination conditions and a more precise image can be captured.

However, since the mirror 20 is located to cover the image pickup device 26, an image cannot be seen on a liquid crystal display (LCD) 28 during shooting such that a live view (also known as a preview) function is not offered and only an image review on the LCD 28 of the conventional SLR camera 1 is possible after taking a picture. That is, since an image should be seen through the optical viewfinder 40, the field of view is limited and scenes at various angles including a low angle and a high angle are hidden. Also, when a subject, which is sensitive to any action, should be looked at furtively for a long time and instantaneously photographed, the conventional SLR camera 1 becomes inconvenient because the user must view the subject through the optical viewfinder 40 and because the camera 1 is too heavy to hold for a long time in the same position.

Also, even when a conventional SLR camera 1 can offer a live view function, since a release time lag between the depression of a release button and the commencement of the movement of the shutter is long, an optimal shooting chance is gone and the release time lag is long.

SUMMARY OF THE INVENTION

The present invention provides a focal plane shutter, which can offer a live view function, and improve a control velocity of a shutter speed to reduce a time interval between shootings, a photographing apparatus including the focal plane shutter, and a photographing method for the photographing apparatus.

According to an aspect of the present invention, there is provided a focal plane shutter comprising: a front curtain; a rear curtain; a support part coupled to one side of the front curtain and the rear curtain; and a movable part movably contacting one side of the support part, wherein either the front curtain or the rear curtain is independently moved by the motion of the movable part.

When the movable part is moved, the position of the support part contacting the one side of the movable part may be changed to move either the front curtain or the rear curtain.

The focal plane shutter may further comprise an elastic member exerting a predetermined elastic force so that either the front curtain or the rear curtain is independently moved.

The elastic member may exert an elastic force in a direction in which the focal plane shutter closes.

When the movable part is raised, the front curtain may be lowered to open the focal plane shutter.

When the movable part is lowered, the front curtain may be raised due to the elastic force provided by the elastic member to close the focal plane shutter.

According to another aspect of the present invention, there is provided a focal plane shutter included in a photographing apparatus, the focal plane shutter comprising: a front curtain; a rear curtain disposed in parallel to the front curtain; a first front curtain support part comprising a first front curtain lever coupled to one side of the front curtain, a first front curtain arm coupled to one side of the first front curtain lever, and an elastic member interposed between the first front curtain lever and the first front curtain arm and exerting an elastic force between the first front curtain lever and the first front curtain arm; a second front curtain support part coupled to one side of the front curtain; a rear curtain support part coupled to the one side of the rear curtain; a first cam lever movably contacting one side of the first front curtain support part and one side of the rear curtain support part respectively and controlling the front curtain and the rear curtain to open and close; and a second cam lever movably contacting one side of the second front curtain support part and controlling the front curtain to open and close.

In a live view mode of the photographing apparatus, the front curtain and the rear curtain may be separated from each other to open the focal plane shutter.

When shooting is performed in a live view mode of the photographing apparatus, the focal plane shutter may close due to the elastic force exerted by the elastic member, and then an exposure may be started.

The focal plane shutter may close when the front curtain is moved toward the rear curtain due to the elastic force provided by the elastic member.

The first front curtain lever and the first front curtain may be pinned to each other to rotate together.

The elastic member interposed between the first front curtain lever and the first front curtain arm may exert an elastic force so that the first front curtain lever rotates in a direction in which the focal plane shutter closes.

The second front curtain support part may comprise: a second front curtain lever coupled to the one side of the front curtain; and a second front curtain arm coupled to one side of the second front curtain lever, wherein the second front curtain support part is rotatable about a junction between the second front curtain lever and the second front curtain arm.

The rear curtain support part may comprise: a rear curtain lever coupled to one side of the rear curtain; and a rear curtain arm coupled to one side of the rear curtain lever, wherein the rear curtain support part is rotatable about a junction between the rear curtain lever and the rear curtain arm.

A first front curtain control part and a rear curtain control part may be formed at one side of the first cam lever and respectively control the front curtain and the rear curtain to open and close.

The first cam lever may be vertically movable so that when the first cam lever is lowered, the first front curtain control part and the rear curtain control part respectively press the first front curtain support part and the rear curtain support part to raise the front curtain and the rear curtain.

The first cam lever may be vertically movable so that when the first cam lever is raised, the front curtain and the rear curtain are lowered due to their own weights.

A second front curtain control part may be formed on one side of the second cam lever and control the front curtain to open and close.

The second cam lever may be vertically movable so that when the second cam lever is raised, the second front curtain control part raises the second front curtain support part to lower the front curtain, and the elastic member is elastically deformed to some extent.

The second cam lever may be vertically movable so that when the second cam lever is lowered, the front curtain is raised due to the elastic force provided by the elastic member.

According to another aspect of the present invention, there is provided a photographing apparatus comprising: a lens through which light is incident; an image pickup device converting the incident light into an electrical signal; a display part displaying as an image signal the electrical signal received from the image pickup device; and an embodiment of the foregoing focal plane shutter that is interposed between the lens and the image pickup device for controlling the amount of light incident on the image pickup device.

According to another aspect of the present invention, there is provided a photographing method for a photographing apparatus including a focal plane shutter, the method comprising: opening the focal plane shutter to perform a live view function; closing the shutter due to an elastic force exerted by an elastic member, when a shutter release button is depressed; moving a front curtain and a rear curtain of the focal plane shutter at a certain interval to perform an exposure; photographing an image; and closing the focal plane shutter for a next shooting.

The opening of the focal plane shutter to perform the live view function may comprise moving the front curtain and the rear curtain apart from each other.

When the opening of the focal plane shutter to perform the live view function is performed, the elastic member may be elastically deformed to some extent.

The closing of the shutter due to the elastic member exerted by the elastic member may be performed by moving the front curtain toward the rear curtain.

The closing of the shutter due to the elastic member exerted by the elastic member may be performed due to an elastic force exerted in a direction in which the elastically deformed elastic member returns to its initial state.

Accordingly, a live view function can be preformed, and a control velocity of a shutter speed can be improved to reduce a time interval between shootings.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
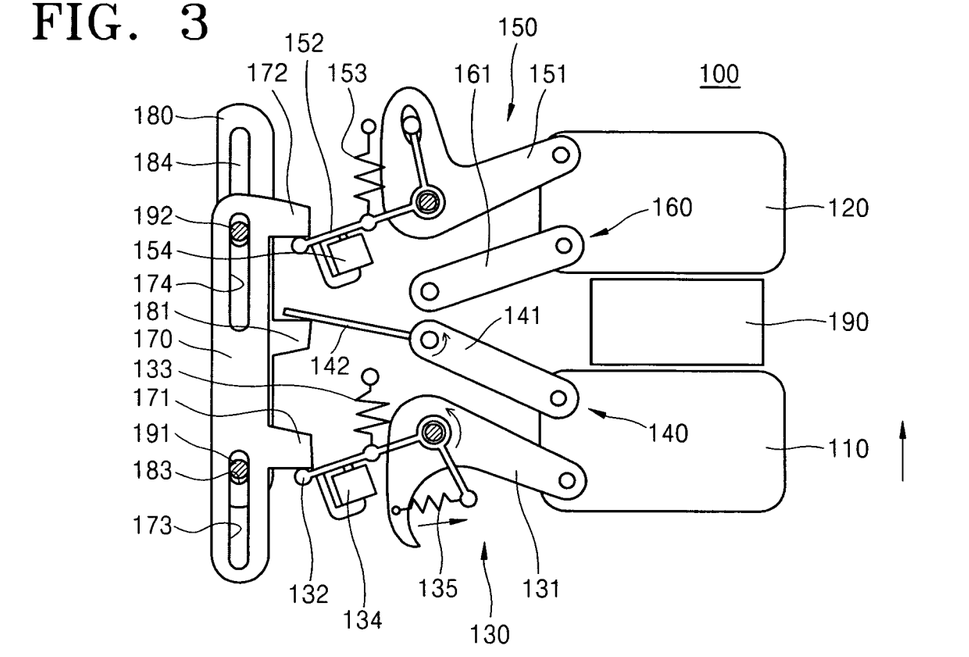
FIG. 3 is a cross-sectional view of a focal plane shutter according to an embodiment of the present invention.

FIG. 3 is a cross-sectional view of a focal plane shutter 100 according to an embodiment of the present invention.

Referring to FIG. 3, the focal plane shutter 100 includes a front curtain 110, a rear curtain 120, a first front curtain support part 130, a second front curtain support part 140, a first rear curtain support part 150, a second rear curtain support part 160, a first cam lever 170, and a second cam lever 180.

The front curtain 110 and the rear curtain 120 are cloths or metal curtains that are disposed generally in parallel to each other, and move relative to each other to expose or conceal an aperture 190. That is, when the front curtain 110 and the rear curtain 120 are proximate to each other and there is no gap therebetween, the aperture 190 is concealed or closed. When the front curtain 110 and the rear curtain 120 are spaced apart from each other, the aperture 190 is exposed or opened.

Although the front curtain 110 and the rear curtain 120 are shown in the Figures as moving relative to each other in a vertical direction, the present embodiment is not limited to vertically-moving curtains. That is, the front curtain 110 and the rear curtain 120 may move relative to each other in a horizontal direction. However, since most photographing apparatuses are normally configured to capture landscape images (i.e., a width of the image being greater than a height of the image), a vertical travel shutter travels a shorter side of a screen than a horizontal travel shutter does. Accordingly, the vertical travel shutter can have a shorter travel time and a higher shutter blind speed. To this end, a vertical travel shutter in which the front curtain 110 and the rear curtain 120 move relative to each other in a vertical direction will be explained hereinafter.

The first front curtain support part 130 and the second front curtain support part 140 are respectively coupled to one side (e.g., the left side as shown) of the front curtain 110. The first front curtain support part 130 and the second front curtain support part 140 support the front curtain 110, and allow the front curtain 110 to be vertically moved to open and close the aperture 190.

The first front curtain support part 130 includes a first front curtain lever 131, a first front curtain arm 132, and an elastic member 135.

The first front curtain lever 131 is coupled at one end to the side of the front curtain 110. That is, the first front curtain lever 131 substantially has a generally sideways L-shape with the end of the generally horizontal portion of the L-shape being coupled with a lower, left-hand corner of the front curtain 110. An end of the generally vertical portion of the L-shape is coupled with an end of the elastic member 135.

The first front curtain arm 132 is also configured to have a generally sideways L-shape. The first front curtain arm 132 and the first front curtain lever 131 are generally mirror images of each other. One end of the first front curtain arm 132 that is most distal from the front curtain 110 contacts the first cam lever 170. Corner portions of the first front curtain arm 132 and the first front curtain lever 131 are rotatably coupled together. The elastic member 135 is coupled between ends of the vertical portions of the L-shaped first front curtain arm 132 and first front curtain lever 131. The elastic member 135 has a normal bias that urges the vertical portions of the first front curtain arm 132 and the first front curtain lever 131 to be proximate to each other so that the first front curtain arm 132 and the first front curtain lever 131 define a generally T-shaped first front curtain support 130. The elastic member 135 may be an extension spring or the like that resists relative rotation of the first front curtain arm 132 and the first front curtain lever 131, thereby causing the first front curtain arm 132 and the first front curtain lever 131 to return the first front curtain support 130 to its T-shaped configuration.

Figure 4:
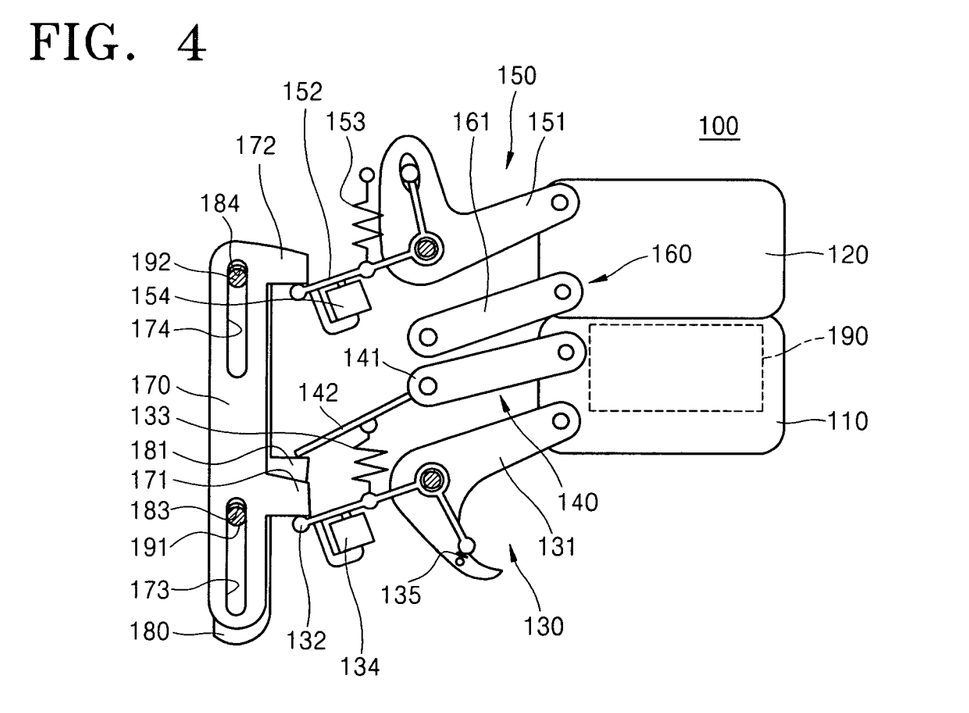
FIGS. 4 through 7 are cross-sectional views illustrating movements of various components of the focal plane shutter of FIG. 3.

Since corner portion of the first front curtain lever 131 and the first front curtain arm 132 are coupled to each other, the first front curtain lever 131 and the first front curtain arm 132 can rotate relative to each other. The elastic member 135, which is interposed between the first front curtain lever 131 and the first front curtain arm 132, provides a predetermined elastic force between the first front curtain lever 131 and the first front curtain arm 132. In detail, referring to FIG. 3, the elastic force of the elastic member 135 resists relative rotation of the first front curtain lever 131 and the first front curtain arm 132 and urges the ends of the first front curtain lever 131 and the first front curtain arm 132 to be proximate to each other. In operation, when the first front curtain arm 132 is pressed downward and held in a downward orientation by the first cam lever 170 (e.g., as shown in FIG. 3), lower ends of the first front curtain lever 131 and first front curtain arm 132 become separated. However, the elastic member 135 forces the first front curtain lever 131 to rotate counterclockwise to restore the normal, generally T-shaped configuration of the first front curtain support 130, thereby raising the front curtain 110 (e.g., as shown in FIG. 4).

A front curtain spring 133 is coupled to the first front curtain arm 132 intermediate the corner portion of the arm 132 and the end that contacts the first cam lever 170. One end of the front curtain spring 133 is coupled to the first curtain arm 132, and the other end of the front curtain spring 133 is fixed. The front curtain spring 133 may be a compression spring so that it exerts an elastic force that resists compression of the front curtain spring 133. Accordingly, the first front curtain arm 132 is forced to rotate counterclockwise to raise the front curtain 110.

A front curtain magnet 134 is configured to contact a lower portion of the first front curtain arm 132 intermediate the corner portion of the arm 132 and the end that contacts the first cam lever 170. When electric current flows through the front curtain magnet 134, the front curtain magnet 134 has a predetermined magnetic force and acts as an electromagnet. As shown in FIG. 4, the magnetic force provided by the front curtain magnet 134 causes the front curtain 110 to be fixedly supported instead of lowering by its own weight.

The second front curtain support part 140 includes a second front curtain lever 141 and a second front curtain arm 142.

One end of the second front curtain lever 141 is coupled to the side of the front curtain 110 (e.g., the left side as shown, more particularly the upper left-hand corner). The second front curtain arm 142 is coupled to one side of the second front curtain lever 141. The other end of the second front curtain arm 142 contacts the second cam lever 180.

The second front curtain lever 141 and the second front curtain arm 142 are firmly attached to each other and integrally moved (i.e., the second front curtain lever 141 and the second front curtain arm 142 are fixed to each other and do not move relative to each other). However, the second front curtain lever 141 and the second front curtain arm 142 can rotate or pivot about a junction therebetween. Because the second front curtain support part 140 rotates about the junction between the second front curtain lever 141 and the second front curtain arm 142, the second front curtain support part 140 cooperates with the first front curtain support part 130 to raise or lower the front curtain 110. As can be appreciated, the first and second front curtain support parts 130, 140 define a generally parallelogram-shaped linkage mechanism for moving the front curtain 110.

The first rear curtain support part 150 and the second rear curtain support part 160 are respectively coupled to one side of the rear curtain 120 (e.g., the left side as shown). The first rear curtain support part 150 and the second rear curtain support part 160 support the rear curtain 120, and allow the rear curtain 120 to be vertically moved to open and close the aperture 190.

The first rear curtain support part 150 includes a rear curtain lever 151 and a rear curtain arm 152.

The rear curtain lever 151 is coupled to the side of the rear curtain 120. The rear curtain lever 151 is configured to have a generally sideways L-shape that is generally a mirror image of the front curtain lever 131. That is, a vertical portion of the L-shaped rear curtain lever 151 is oriented upward whereas a vertical portion of the L-shaped front curtain lever 131 is oriented downward. One end of the rear curtain lever 151 is coupled to the side of the rear curtain 120 (e.g., the left side, more particularly the upper left-hand corner). The other end of the rear curtain lever 151 and a corner portion thereof are coupled to the rear curtain arm 152. That is, since the rear curtain lever 151 and the rear curtain arm 152 are coupled at two points, the rear curtain lever 151 and the rear curtain arm 152 are firmly attached to each other and integrally move. Another end of the rear curtain arm 152 (i.e., the end that is most distal from the rear curtain 120) contacts the first cam lever 170.

The rear curtain arm 152, which is coupled with the rear curtain lever 151, is configured to have a generally sideways L-shape so that the rear curtain arm 152 is generally a mirror image of the rear curtain lever 151. Accordingly, the rear curtain lever 151 and the rear curtain arm 152 are coupled together to define an upside-down, generally T-shaped member. Also, the rear curtain lever 151 and the rear curtain arm 152 are pinned at a junction to each other (i.e., a location at which the corner portions are coupled together) and can rotate about the pinned junction. That is, the first rear curtain support part 150 rotates about the junction between the rear curtain lever 151 and the rear curtain arm 152 to raise or lower the rear curtain 120.

Figure 6:
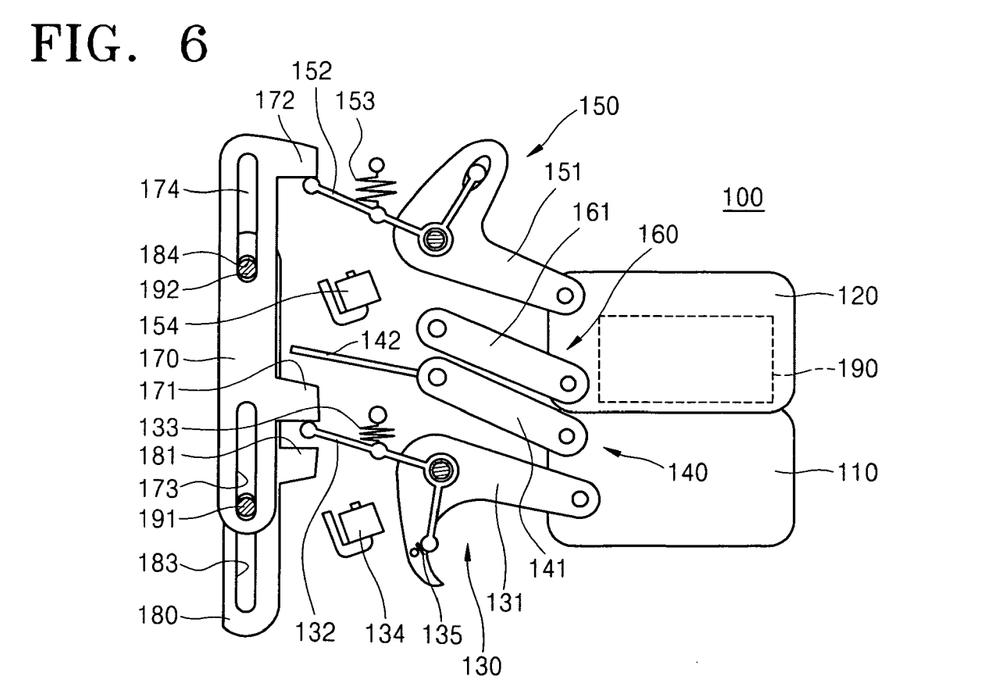

A rear curtain spring 153 is coupled to the rear curtain arm 152. One end of the rear curtain spring 153 is coupled to the rear curtain arm 152 intermediate a corner portion of the arm 152 and the end that contacts the first cam lever 170. The other end of the rear curtain spring 153 is fixed. The rear curtain spring 153 may be a compression spring that exerts an elastic force to resist compression of the spring 153. When the spring 153 is compressed as shown in FIG. 6, the spring 153 forces the rear curtain arm 152 to rotate counterclockwise thereby raising the rear curtain 120 to an orientation shown in FIG. 7.

A rear curtain magnet 154 is configured to contact a side of the rear curtain arm 152 intermediate the corner portion and an end that contacts the first cam lever 170. When electric current flows through the rear curtain magnet 154, the rear curtain magnet 154 has a predetermined magnetic force and acts as an electromagnet. In this case, due to a magnetic force provided by the rear curtain magnet 154, the rear curtain 120 is not lowered by its own weight, but is fixedly supported.

The second rear curtain support part 160 has a shape similar to that of the second front curtain lever 141. One end of the second rear curtain support part 160 is coupled to the one side of the rear curtain 120, and the other end of the second rear curtain support part 160 is coupled to an inside portion of the photographing apparatus (e.g., a portion of the focal plane shutter 100). Similar to the first and second front curtain support parts 130, 140, the first and second rear curtain support parts 150, 160 define a generally parallelogram-shaped linkage mechanism for moving the rear curtain 120.

The first cam lever 170 includes a first front curtain control part 171 and a rear curtain control part 172. The first cam lever 170 controls the front curtain 110 and the rear curtain 120 to open and close.

In detail, the first cam lever 170 is formed beside the generally parallelogram-shaped linkage mechanisms defined by the first front curtain support part 130, the second front curtain support part 140, the first rear curtain support part 150, and the second rear curtain support part 160. The first cam lever 170 has a elongated bar shape and is vertically oriented. The first front curtain control part 171 and the rear curtain control part 172 respectively protrude from a middle portion and an upper portion of the first cam lever 170.

The protruding first front curtain control part 171 can contact the first front curtain arm 132. In detail, the first front curtain arm 132 contacts a bottom surface of the first front curtain control part 171. The protruding rear curtain control part 172 can contact the rear curtain arm 152. In detail, the rear curtain arm 152 contacts a bottom surface of the rear curtain control part 172.

The first cam lever 170 is vertically moved, for example by a first cam, actuator, etc. (not shown). That is, when the first cam lever 170 is lowered, the first front curtain control part 171 and the rear curtain control part 172 respectively press downward on the first front curtain arm 132 and the rear curtain arm 152, such that the first front curtain support part 130 and the first rear curtain support part 150 rotate counterclockwise about their pinned junctions, to raise the front curtain 110 and the rear curtain 120.

On the contrary, when the first cam lever 170 is raised, the first front curtain control part 171 and the rear curtain control part 172 respectively stop pressing on the first front curtain arm 132 and the rear curtain arm 152 such that the first front curtain support part 130 and the first rear curtain support part 150 rotate clockwise about their pinned junctions due to the weights of the front curtain 110 and the rear curtain 120, thereby lowering the front curtain 110 and the rear curtain 120.

The second cam lever 180 includes a second front curtain control part 181. The second cam lever 180 controls the front curtain 110 to open and close.

In detail, the second cam lever 180 is formed behind the first cam lever 170 as shown in FIG. 3. One or more grooves 173 and 174, and 183 and 184 are respectively formed in the first cam lever 170 and the second cam lever 180. Pins 191 and 192 are inserted into the grooves 173, 174, 183, and 184. Accordingly, the first cam lever 170 and the second cam lever 180 are vertically moved along the pins 191 and 192 inserted into the grooves 173, 174, 183, and 184.

The second cam lever 180 is formed beside the first front curtain support part 130, the second front curtain support part 140, the first rear curtain support part 150, and the second rear curtain support part 160. The second cam lever 180 has an elongated bar shape, which is similar to the first cam lever 170, and the second front curtain control part 181 protrudes from a middle portion of the second cam lever 180.

The protruding second front curtain control part 181 can contact the second front curtain arm 142. In detail, the second front curtain arm 142 contacts a top surface of the second front curtain control part 181.

The second cam lever 180 can be vertically moved by a second cam, actuator, etc. (not shown). That is, when the second cam 180 is raised, the second front curtain control part 181 of the second cam lever 180 raises the second front curtain arm 142, such that the second front curtain support part 140 rotates clockwise about the pinned junction to lower the front curtain 110 (compare FIG. 4 wherein the front curtain 110 is raised with FIG. 3 wherein the front curtain 110 is lowered).

On the contrary, when the second cam lever 180 is lowered, the second front curtain control part 181, which supports the second front curtain arm 142, is lowered such that the second front curtain support part 140 rotates counterclockwise about the pinned junction due to the elastic force of the elastic member 135, to raise the front curtain 110.

The operation of the focal plane shutter 100 will now be explained in detail.

FIGS. 3 through 7 are cross-sectional views illustrating the operation of the focal plane shutter 100 of FIG. 3. FIG. 8 is a timing chart illustrating the operation of a photographing apparatus including a focal plane shutter according to an embodiment of the present invention.

FIG. 3 illustrates the front curtain 110 and the rear curtain 120 being separated from each other thereby opening the focal plane shutter 100 so that the photographing apparatus operates in a live view mode. That is, the photographing apparatus is configured such that, in a live view mode, the front curtain 110 and the rear curtain 120 are separated from each other to open the focal plane shutter 100, thereby enabling an image of a subject incident through a lens to be displayed on an LCD via an image pickup device.

In the case of an SLR camera, it is natural that, in a live view mode, a mirror is automatically moved to enable light incident through a lens to be incident on a focal plane shutter and an image pickup device.

Although it is described that the focal plane shutter 100 opens and a live view function is performed only in a live view mode of the photographing apparatus, the present embodiment is not limited thereto. That is, without a separate optical viewfinder, the focal plane shutter 100 may open and a live view function may be performed. In this case, since the separate optical viewfinder is not necessary, elements, such as a mirror and a pentaprism, for watching a subject using the optical viewfinder are not necessary, thereby making the photographing apparatus light and compact, reducing manufacturing costs, and simplifying a manufacturing process. In other words, the photographing apparatus can be made compact and light and have lens interchangeability.

Referring to FIG. 3 again, the first cam lever 170 and the second cam lever 180 are moved relative to each other so that the first cam lever 170 is in a lowered state and the second cam lever 180 is in a raised state. Accordingly, the second front curtain control part 181 is positioned between the first front curtain control part 171 and the rear curtain control part 172.

Figure 7:
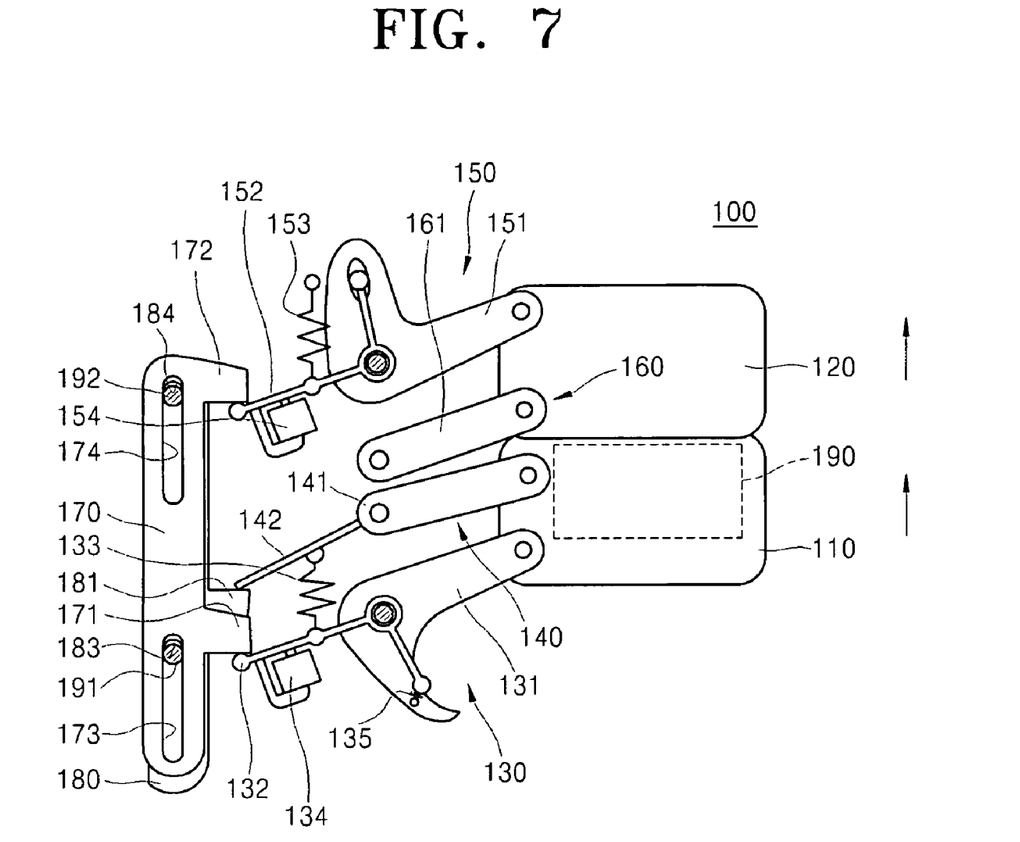
Figure 8:
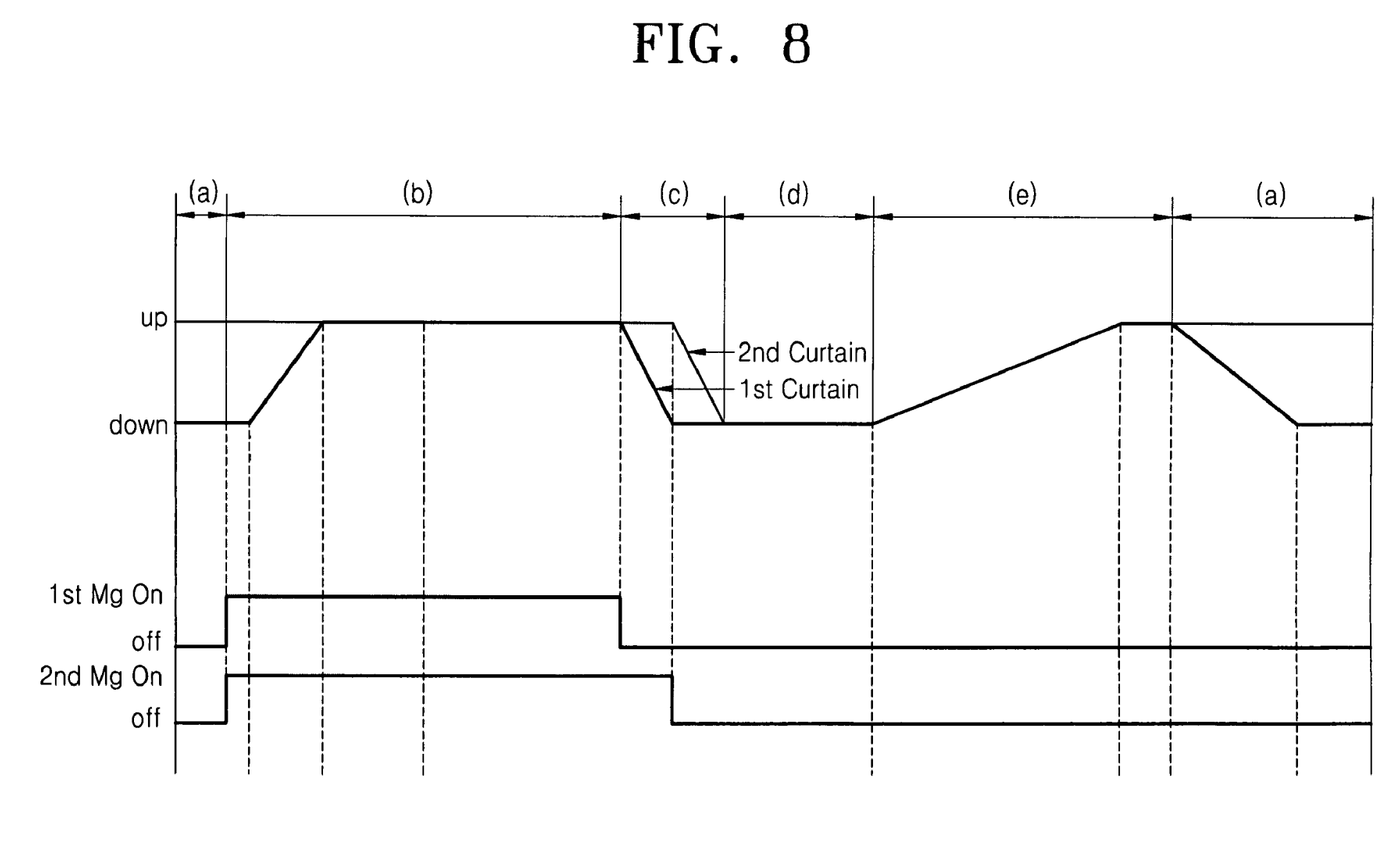
FIG. 8 is a timing chart illustrating the operation of a photographing apparatus including a focal plane shutter according to an embodiment of the present invention.

When the first cam lever 170 is lowered relative to the second cam lever 180 (as is illustrated by FIGS. 6 and 7 in sequence), the first front curtain control part 171 and the rear curtain control part 172 of the first cam lever 170 respectively press the first front curtain arm 132 and the rear curtain arm 152. Accordingly, the first front curtain support part 130 and the first rear curtain support part 150 rotate counterclockwise about their pinned junctions, thereby raising the front curtain 110 and the rear curtain 120.

However, in the state shown in FIG. 7 (i.e., the first and second curtains 110, 120 being raised), when the second cam lever 180 is raised relative to the first cam lever 170, the second front curtain control part 181 raises the second front curtain arm 142, such that the second front curtain support part 140 rotates clockwise about the pinned junction and lowers the front curtain 110.

That is, since only the front curtain 110 is lowered while the rear curtain 120 is in the raised state, the focal plane shutter 100 opens, and a live view function can be performed by the open focal plane shutter 100.

In this state, since the elastic member 135 is longer than its initial length, an elastic force is exerted in a direction of the marked arrow, as illustrated in FIG. 3, such that the ends of the first front curtain lever 131 and the first front curtain arm 132 coupled to the elastic member 135 become closer to each other. To this end, the elastic member 135 urges the front curtain 110 to be raised for stopping the live view function. However, since the second front curtain control part 181 is moved upward for supporting the second front curtain support part 140, the front curtain 110 remains in its lowered state to maintain the focal plane shutter 100 open.

Also, in this state, since the front curtain spring 133 and the rear curtain spring 153 are longer than their initial lengths, an elastic force is exerted in a direction in which the front curtain spring 133 and the rear curtain spring 153 are compressed. That is, the first front curtain arm 132 and the rear curtain arm 152 are forced to be raised by the front curtain spring 133 and the rear curtain spring 153.

Also, in this state, the front curtain magnet 134 and the rear curtain magnet 154 are respectively in contact with the first front curtain arm 132 and the rear curtain arm 152. However, since no current flows through the front curtain magnet 134 and the rear curtain magnet 154, no separate magnetic force is formed. Flow of electric current through the front curtain magnet 134 and the rear curtain magnet 154 may be controlled by a controller of the photographing apparatus, for example a predetermined microprocessor (not shown).

FIG. 4 illustrates that, the focal plane shutter 100 closes due to an elastic force provided by the elastic member 135.

In the state of FIG. 3 where the live view function is performed, when a user depresses a shutter release button of the photographing apparatus, both the front curtain 110 and the rear curtain 120 are raised to close the focal plane shutter 100 for initiating an exposure.

In the case of a conventional bulb shutter, in order to raise both a front curtain and a rear curtain and close a focal plane shutter, the rear curtain is lowered to close the focal plane shutter, and then the front curtain and the rear curtain are raised together. Since such a conventional focal plane shutter should undergo all the operations of lowering the rear curtain and raising both the front curtain and the rear curtain, a release time lag from the depression of a shutter release button to the start of an exposure is long.

To solve the problem, the front curtain 110 can be independently raised by the elastic force provided by the elastic member 135, thereby reducing a release time lag from the depression of a shutter release button to the start of an exposure.

In detail, when a user depresses the shutter release button of the photographing apparatus, the second cam lever 180 is lowered, and thus the second front curtain control part 181 of the second cam lever 180, which supports the second front curtain arm 142, is lowered, and thus, the second front curtain arm 142 is no longer supported. Accordingly, the elastic member 135 (e.g., an extension spring that is extended) provides an elastic force in a direction in which the ends of the first front curtain lever 131 and the first front curtain arm 132 become closer to each other as described above, such that the first front curtain lever 131 of the first front curtain support part 130 and the second front curtain support part 140 rotate counterclockwise, to raise the front curtain 110 in a direction of the marked arrow as illustrated in FIG. 3. Thus, the shutter 100 becomes closed as shown in FIG. 4.

In this configuration, since a control velocity of a shutter speed is improved and a preparation time for a next shooting is reduced, a time interval between shootings can be reduced.

Also, in this state, since the front curtain spring 133 and the rear curtain spring 153 are extended longer than their initial lengths, an elastic force is exerted in a direction in which the front curtain spring 133 and the rear curtain spring 153 are compressed. That is, the first front curtain arm 132 and the rear curtain arm 152 are forced to be raised by the front curtain spring 133 and the rear curtain spring 153.

Also, in this state, the front curtain magnet 134 and the rear curtain magnet 154 are respectively in contact with the first front curtain arm 132 and the rear curtain arm 152. Electric current flows through the front curtain magnet 134 and the rear curtain magnet 154, and thus the front curtain magnet 134 and the rear curtain magnet 135 have a predetermined magnetic force and act as electromagnets. That is, since the front curtain magnet 134 and the rear curtain magnet 154 act as electromagnets and provide magnetic forces, the front curtain 110 and the rear curtain 120 are not lowered by their own weights, but are fixedly supported. Whether electric current flows through the front curtain magnet 134 and the rear curtain magnet 154 may be controlled by the microprocessor.

Figure 5:
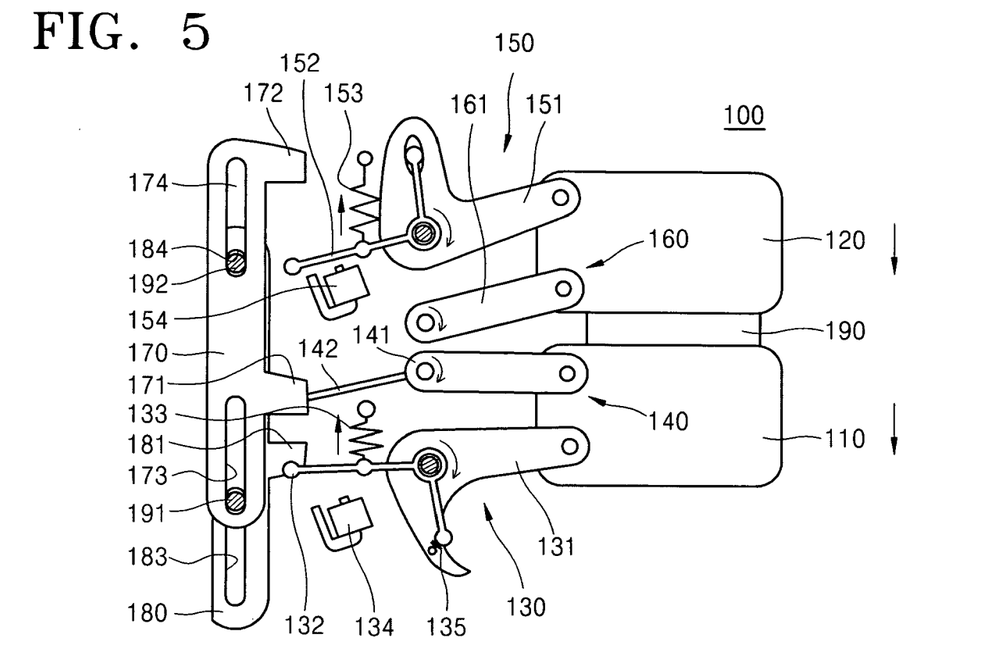

FIG. 5 illustrates that an exposure is performed while the front curtain 110 and the rear curtain 120 of the focal plane shutter 100 are lowered at a predetermined interval.

In the state of FIG. 4 where both the front curtain 110 and the rear curtain 120 are raised, the focal plane shutter 100 closes and preparation for an exposure is completed. Once various values necessary for actual shooting, such as an exposure time, an auto focusing (AF) level, and an auto exposure (AE) level, are calculated, the front curtain 110 and the second curtain 120 are lowered at a predetermined interval to perform an exposure.

Starting with the configuration shown in FIG. 4, first the first cam lever 170 is raised as shown in FIG. 5 so that the first front curtain control part 171 and the rear curtain control part 172 are raised, thereby stopping the pressing on (i.e., releasing) the first front curtain arm 132 and the rear curtain arm 152. At this time, if no force (e.g., electromagnetic force from one or both of the magnets 134, 154) is applied to the first front curtain support part 130 and the first rear curtain support part 150, the front curtain 110 and the rear curtain 120 begin to lower simultaneously due to their own weights as is indicated in FIG. 5 by the downward-pointing arrows.

However, since electric current flows through the front curtain magnet 134 and the rear curtain magnet 154 and the front curtain magnet 134 and the rear curtain magnet 154 act as electromagnets as described above, the front curtain 110 and the rear curtain 120 are not lowered by their own weights, but are fixedly supported.

In this state, when the front curtain magnet 134 and the rear curtain magnet 154 are turned off at predetermined instants (e.g., after a time interval (b) as shown in FIG. 8), the front curtain 110 and the rear curtain 120 are respectively lowered at a predetermined interval due to their own weights and elastic forces provided by the front curtain spring 133 and the rear curtain spring 153. As shown in FIG. 8, the first magnet (i.e., magnet 134) is first turned off at the beginning of interval (c) so that front curtain 110 can be lowered to expose the aperture 190. Next as shown in FIG. 8, the second magnet (i.e., magnet 154) is turned off and the exposure takes place during interval (c). That is, due to the elastic forces and the weights, the first front curtain support part 130, the second front curtain support part 140, the first rear curtain support part 150, and the second rear curtain support part 160 rotate clockwise about their pinned junctions, to lower the front curtain 110 and the rear curtain 120 in a direction of the marked arrow of FIG. 5.

Accordingly, the focal plane shutter 100 opens in an instant to perform an exposure due to a difference between points of times when the front curtain 110 and the rear curtain 120 begin to be lowered. Here, the difference between the points of time when the front curtain 110 and the rear curtain 120 begin to be lowered, that is, a difference between points of time when the front curtain magnet 134 and the rear curtain magnet 154 are turned off, may be determined by the microprocessor considering light intensity, a distance to a subject and predefined values set by a user.

FIG. 6 illustrates a configuration of the shutter 100 after an exposure is performed and the focal plane shutter 100 closes.

When the front curtain 110 and the rear curtain 120 are completely lowered and the exposure is completed, the focal plane shutter 100 closes. The photographing apparatus converts an image of a subject introduced as a light beam through the focal plane shutter 100 into an electrical signal to obtain an image signal representing one still image, and converts the image signal into a digital signal. The photographing apparatus performs a process, such as a YC process, for the digital signal to obtain a predetermined digital image signal. The digital image signal representing the photographed image is recorded in a semiconductor memory. The recorded image signal may be read at any time and displayed on a display unit of a camera, reproduced as a printable signal, or output and displayed on a display device.

Also, in this state, since the front curtain spring 133 and the rear curtain spring 153 return to their original lengths, no elastic force is applied. Also, in this state, no magnetic forces are applied by the front curtain magnet 134 and the rear curtain magnet 154.

FIG. 7 illustrates that one shooting is completed, and the front curtain 110 and the rear curtain 120 of the focal plane shutter 100 are raised for a next shooting.

When one shooting is completed, the focal plane shutter 100 prepares for a next shooting. In detail, since the photographing apparatus is still in the live view mode, in order to enable an image of a subject incident through the lens to be displayed through the image pickup device on the LCD, the focal plane shutter 100 must open again. As shown in FIG. 8, the shooting is completed at the end of interval (d) and, subsequently, during interval (e) the front and rear curtains 110, 120 are raised together to be in the configuration shown in FIG. 7.

To this end, the front curtain 110 and the rear curtain 120 are raised together. That is, when the first cam lever 170 is lowered, the first front curtain control part 171 and the rear curtain control part 172 of the first cam lever 170 respectively press the first front curtain arm 132 and the rear curtain arm 152, such that the first front curtain support part 130 and the first rear curtain support part 150 rotate counterclockwise about their pinned junctions, to raise the front curtain 110 and the rear curtain 120. At this time, since the front curtain 110 and the rear curtain 120 are raised simultaneously, the focal plane shutter 100 remains in its closed state.

Also, in this state, since the front curtain spring 133 and the rear curtain spring 153 are extended longer than their initial lengths, an elastic force is exerted in a direction in which the front curtain spring 133 and the rear curtain spring 153 are compressed. That is, the first front curtain arm 132 and the rear curtain arm 152 are forced to be raised respectively by the front curtain spring 133 and the rear curtain spring 153.

Also, in this state, the front curtain magnet 134 and the rear curtain magnet 154 are respectively in contact with the first front curtain arm 132 and the rear curtain arm 152. However, since current does not flow through the front curtain magnet 134 and the rear curtain magnet 154, no separate magnetic force is formed.

Finally, from the configuration shown in FIG. 7, the focal plane shutter 100 returns to the state of FIG. 3 with the curtains 110, 120 being separated, thereby completing one cycle of one shooting. That is, after the curtains 110, 120 are raised during interval (e) of FIG. 8, the front curtain 110 is then lowered at the end of interval (e)/beginning of interval (a).

In detail, when the second cam lever 180 is raised in order to open the focal plane shutter 100 again, the second front curtain control part 181 of the second cam lever 180 raises the second front curtain arm 142, such that the second front curtain support part 140 rotates clockwise about the pinned junction, to lower the front curtain 110.

That is, since only the front curtain 110 is lowered while the rear curtain 120 is in the raised state, the focal plane shutter 100 opens so that a live view function is performed by the open focal plane shutter 100, and preparation for a next shooting is finished, thereby completing the one cycle for one shooting.

An SLR camera using the focal plane shutter 100 can have a live view function. Also, when the shutter release button is depressed, since the front raise curtain is raised independently to perform an exposure, unlike the conventional camera in which the rear curtain is lowered and then both the front curtain and the rear curtain are raised, a control velocity of a shutter speed can be improved drastically. As a result, in continuous shooting, a time interval between shootings can be reduced.

Figure 9:
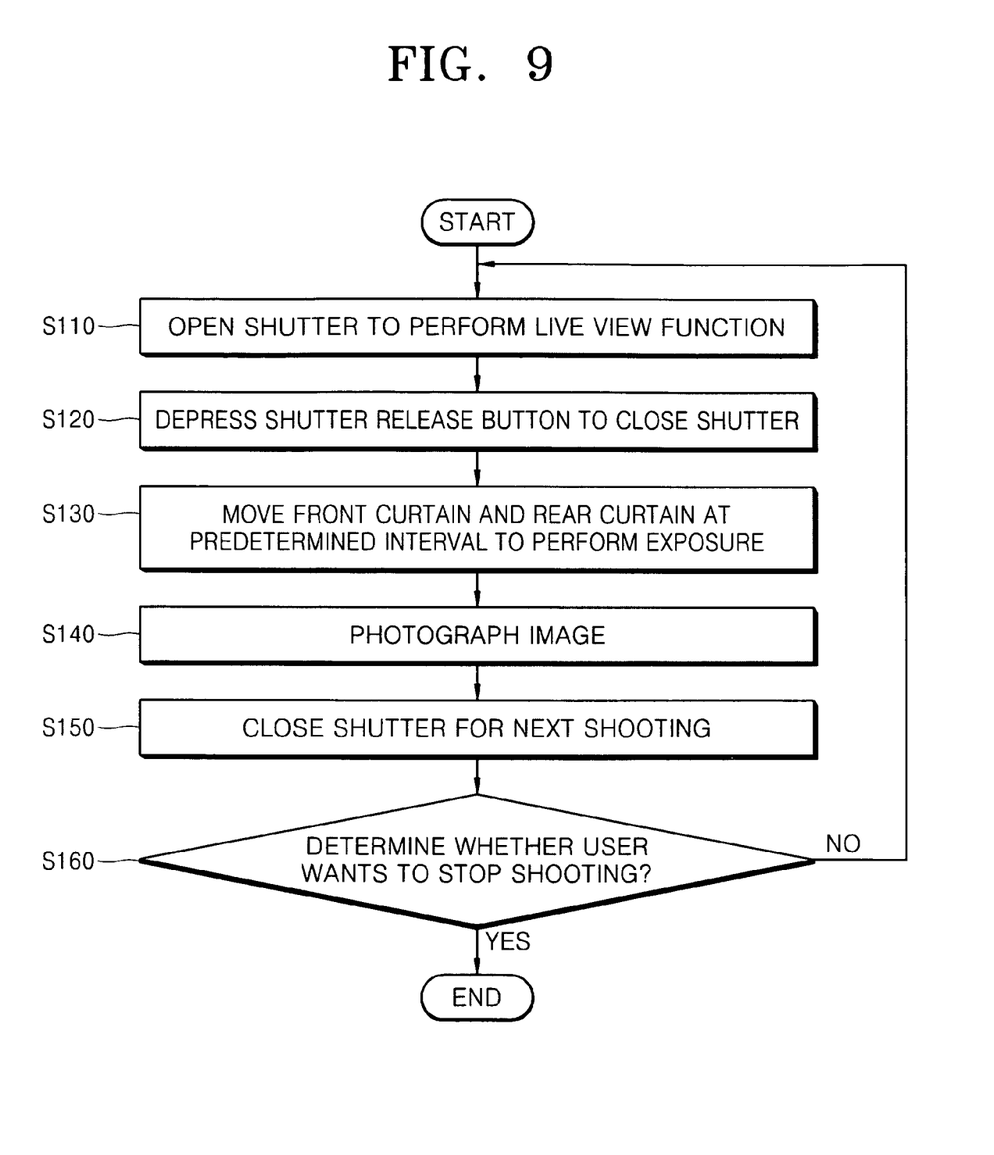
FIG. 9 is a flowchart illustrating a photographing method according to an embodiment of the present invention.

FIG. 9 is a flowchart illustrating a photographing method according to an embodiment of the present invention.

Referring to FIG. 9, in operation S110, a shutter opens to perform a live view function. In operation S120, a shutter release button is depressed to close the shutter. In operation S130, a front curtain and a rear curtain of the shutter are moved at a predetermined interval to perform an exposure (e.g., as shown in FIG. 8, first the front curtain 110 is moved and then the rear curtain 120 is moved after a predetermined period of time). In operation S140, an image is photographed. In operation S150, the shutter closes for a next shooting.

In operation S110, a shutter opens to perform a live view function. In detail, in a live view mode, the first cam lever 170 of the focal plane shutter 100 is lowered and the second cam lever 180 is raised. Accordingly, the front curtain 110 is lowered and the rear curtain 120 is raised, such that the front curtain 110 and the rear curtain 120 are spaced apart from each other (see FIG. 3). Accordingly, the focal plane shutter 100 opens, and an image of a subject incident through the lens is displayed through the image pickup device on the LCD.

In operation S120, when a shutter release button is depressed, the shutter closes as shown in FIG. 4. In detail, in the state where the live view mode is performed, when a user depresses the shutter release button, both the front curtain 110 and the rear curtain 120 are raised so as to close the focal plane shutter 100, thereby beginning an exposure. Accordingly, when the user depresses the shutter release button of the photographing apparatus, the second cam lever 180 is lowered, and thus the second front curtain control part 181 of the second cam lever 180 supporting the second front curtain arm 142 is lowered, and thus the second front curtain arm 142 is no longer supported. The elastic member 135 provides an elastic force in a direction in which the ends of the first front curtain lever 131 and the first front curtain arm 132 become closer to each other, such that the first front curtain lever 131 of the first front curtain support part 130 and the second front curtain support part 140 rotate counterclockwise, to raise the front curtain 110.

In operation S130, the front curtain 110 and the rear curtain 120 of the shutter are moved at a predetermined interval to perform an exposure. In detail, in the state where the focal plane shutter 100 closes and preparation for an exposure is completed, once various values necessary for actual shooting, such as an exposure time, an AF level, and an AE level, are completely calculated, the front curtain 110 and the rear curtain 120 are lowered at a predetermined interval, to perform an exposure.

That is, the first cam lever 170 is raised, and thus the first front curtain control part 171 and the rear curtain control part 172 of the first cam lever 170 respectively pressing the first front curtain arm 132 and the rear curtain arm 152 are raised. At this time, since electric current flows through the front curtain magnet 134 and the rear curtain magnet 154 and the front curtain magnet 134 and the rear curtain magnet 154 act as electromagnets, the front curtain 110 and the rear curtain 120 are not lowered by their own weights, but are fixedly supported. In this state, when the front curtain magnet 134 and the rear curtain magnet 154 are turned off at a predetermined interval, the front curtain 110 and the rear curtain 120 are respectively lowered at a predetermined interval due to their own weights and elastic forces provided by the front curtain spring 133 and the rear curtain spring 153. Accordingly, the focal plane shutter 100 opens in an instant to perform an exposure due to a difference between points of time when the front curtain 110 and the rear curtain 120 begin to be lowered.

In operation S140, an image is photographed. In detail, when the front curtain 110 and the rear curtain 120 are completely lowered (i.e., after interval (c) of FIG. 8) and the exposure is finished, the focal plane shutter 100 closes. During one or more of intervals (d) and (e) shown in FIG. 8, the image pickup device converts an image of a subject introduced as a light beam by the focal plane shutter 100 into an electrical signal to obtain an image signal representing one still image, converts the image signal into a digital signal, and then records the digital signal as a certain image signal through a predetermined process.

In operation S150, the shutter closes for a next shooting. In detail, when one shooting is completed, the focal plane shutter 100 prepares for the next shooting. That is, in order to enable an image of a subject incident through the lens to be displayed through the image pickup device on the LCD, the focal plane shutter 100 should open again. To this end, the front curtain 110 and the rear curtain 120 are raised together (e.g., interval (e) of FIG. 8). That is, when the first cam lever 170 is lowered, the first front curtain control part 171 and the rear curtain control part 172 of the first cam lever 170 respectively press the first front curtain arm 132 and the rear curtain arm 152, such that the first front curtain support part 130 and the first rear curtain support part 150 rotate counterclockwise about their pinned junctions, to raise both the front curtain 110 and the rear curtain 120. At this time, since the front curtain 110 and the rear curtain 120 are raised simultaneously, the focal plane shutter 100 remains in its closed state.

Finally, in operation S160, when a user wants to stop shooting, the photographing apparatus is turned off and shooting is stopped. However, when the user wants to take more photographs, the focal pane shutter 100 returns to operation S110, thereby completing one cycle for one shooting. In detail, when the second cam lever 180 is raised in order to open the focal plane shutter 100 again, the second front curtain control part 181 of the second cam lever 180 raises the second front curtain arm 142, such that the second front curtain support part 140 rotates clockwise about the pinned junction, to lower the front curtain 110. That is, since only the front curtain 110 is lowered while the rear curtain 120 is in the raised state, the focal plane shutter 100 opens (interval (a) shown in FIG. 8), a live view function is performed by the open focal plane shutter 100, and preparation for next shooting is finished, thereby completing one cycle for one shooting.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A focal plane shutter comprising:
   a front curtain;
   a rear curtain;
   a support part coupled at a first end to the front curtain and the rear curtain; and
   a movable part for selectively contacting a second end of the support part, the movable part cooperating with the support part to independently move the front curtain and the rear curtain.

2. The focal plane shutter of claim 1, further comprising an elastic member that exerts a predetermined elastic force so that at least one of the front curtain and the rear curtain is independently moved.

3. The focal plane shutter of claim 2, wherein the elastic member exerts an elastic force in a direction in which the focal plane shutter closes.

4. The focal plane shutter of claim 1, wherein the support part comprises:
   a first generally parallelogram-shaped linkage mechanism connected to the front curtain; and
   a second generally parallelogram-shaped linkage mechanism connected to the rear curtain.

5. The focal plane shutter of claim 4, wherein the movable part comprises:
   a first movable member; and
   a second movable member, the first and second movable members being movable relative to each other for independently moving the first and second generally parallelogram-shaped linkage mechanisms.

6. A focal plane shutter of a photographing apparatus, the focal plane shutter comprising:
   a front curtain;
   a rear curtain disposed in parallel to the front curtain;
   a front curtain lever having a first end and a second end, the first end being coupled to a side of the front curtain;
   a front curtain arm having a free end and a biased end, the biased end being rotatably coupled to the second end of the front curtain lever;
   an elastic member between the biased end and the second end, the elastic member urging the biased end and the second end to be proximate to each other;
   a front curtain support part coupled to the side of the front curtain, the front curtain support part being spaced away from the front curtain lever;
   a rear curtain support part coupled at a first end to a side of the rear curtain that is generally collinear with the side of the front curtain;
   a first cam lever movably contacting the free end of the front curtain arm and a second end of the rear curtain support part for simultaneously moving the front curtain and the rear curtain toward and apart from each other; and
   a second cam lever movably contacting one side of the front curtain support part for moving the front curtain relative to the rear curtain.

7. The focal plane shutter of claim 6, wherein the first cam lever is operable to separate the front and rear curtains in a live view mode of the photographing apparatus.

8. The focal plane shutter of claim 6, wherein, when shooting is performed in a live view mode of the photographing apparatus, the focal plane shutter closes due to the elastic force exerted by the elastic member, and then an exposure is started.

9. The focal plane shutter of claim 8, wherein the focal plane shutter closes when the front curtain is moved toward the rear curtain due to the elastic force provided by the elastic member.

10. The focal plane shutter of claim 6, wherein each of the front curtain lever and the front curtain arm includes a generally mirror-image sideways L-shaped body portion, the elastic member urging the front curtain lever and the front curtain arm into a generally T-shaped second front curtain support part.

11. The focal plane shutter of claim 10, wherein a second front curtain support part and the front curtain support part define a generally parallelogram-shaped linkage mechanism.

12. The focal plane shutter of claim 10 wherein the elastic member is an extension spring.

13. The focal plane shutter of claim 10 wherein the front curtain lever and the front curtain arm are rotatably coupled at corners of the L-shaped body portions.

14. The focal plane shutter of claim 6, wherein the first and second cam levers are vertically movable relative to each other.

15. The focal plane shutter of claim 14 wherein the first cam lever comprises:
   a front curtain control part for contacting the free end of the front curtain arm; and
   a rear curtain control part for contacting the second end of the rear curtain support part,
   wherein, when the first cam lever is lowered, a first front curtain control part of the front curtain control part and the rear curtain control part respectively rotate the front curtain lever and the rear curtain support part to substantially simultaneously raise the front curtain and the rear curtain, and, when the first cam lever is raised, the front curtain and the rear curtain are lowered due to gravity.

16. The focal plane shutter of claim 15, wherein a second front curtain control part of the front curtain control part is formed on one side of the second cam lever for controlling movement of only the front curtain.

17. The focal plane shutter of claim 16, wherein when the second cam lever is raised relative to the first cam lever, the second front curtain control part causes the front curtain to lower and causes the elastic member to be held in a stressed state, and, when the second cam lever is lowered, the front curtain is raised due to an elastic stress released by the elastic member.

18. The focal plane shutter of claim 6, wherein, in a live view mode of the photographing apparatus, the first front curtain support part and the rear curtain support part are fixedly maintained in their positions by the first cam lever.

19. A method for operating a focal plane shutter of an SLR-type camera, the focal plane shutter including independently-movable first and second curtains, the method comprising:
   moving apart the first and second curtains of the focal plane shutter to perform a live view function by moving a movable part that selectively contacts a second end of support parts, the support parts having a first end coupled to the first curtain and the second curtain respectively, the movable part cooperating with the support parts to independently move the first curtain and the second curtain;
   closing the shutter due to an elastic force exerted by an elastic member, when a shutter release button is depressed;
   sequentially moving the first and second curtains of the focal plane shutter at a certain interval to perform an exposure;
   photographing an image; and
   moving together the first and second curtains of the focal plane shutter to close the focal plane shutter for a next shooting.

20. The photographing method of claim 19, wherein, wherein the step of moving apart the first and second curtains of the focal plane shutter to perform the live view function is performed, the elastic member is elastically deformed.

21. The photographing method of claim 19, wherein the step of closing of the shutter due to the elastic force exerted by the elastic member is performed by moving one of the first and second curtains toward the other one of the first and second curtains.

22. The photographing method of claim 21, wherein the closing of the shutter due to the elastic force exerted by the elastic member is performed due to the elastic force being exerted in a direction in which the elastically deformed elastic member returns to its initial state.

23. The photographing method of claim 19, wherein the step of sequentially moving the first and second curtains of the focal plane shutter at a certain interval to perform an exposure comprises:
   fixedly maintaining the first and second curtains in their positions due to a predetermined magnetic force;
   removing the magnetic force applied to the first and second curtains at the certain interval; and
   lowering the first and second curtains of the focal plane shutter at the certain interval to perform an exposure.

* * * * *